(12) United States Patent
Hsueh et al.

(10) Patent No.: US 7,666,317 B2
(45) Date of Patent: Feb. 23, 2010

(54) METHODS AND SYSTEMS FOR DISINFECTING POTABLE WATER SUPPLIES

(75) Inventors: Angela M. Hsueh, Diamond Bar, CA (US); Razmik Baghdassarzadeh Boodaghians, Montrose, CA (US)

(73) Assignee: MAC Aerospace Industries, Inc., Carson, CA (US)

( * ) Notice: Subject to any disclaimer, the term of this patent is extended or adjusted under 35 U.S.C. 154(b) by 17 days.

(21) Appl. No.: 11/274,680

(22) Filed: Nov. 15, 2005

(65) Prior Publication Data

US 2006/0169649 A1 Aug. 3, 2006

Related U.S. Application Data

(63) Continuation-in-part of application No. 11/048,034, filed on Jan. 31, 2005.

(51) Int. Cl.
*C02F 1/50* (2006.01)
(52) U.S. Cl. .................. 210/764; 210/206; 210/748; 210/739
(58) Field of Classification Search ............ 210/744, 210/739, 764, 206, 748, 600
See application file for complete search history.

(56) References Cited

U.S. PATENT DOCUMENTS

| | | | |
|---|---|---|---|
| 3,562,137 A * | 2/1971 | Gehring | ............ 204/258 |
| 4,045,314 A | 8/1977 | Rod et al. | |
| 4,400,270 A | 8/1983 | Hillman | |
| 4,585,562 A | 4/1986 | De Graw et al. | |
| 4,608,247 A | 8/1986 | Heinig, Jr. | |
| 4,752,401 A | 6/1988 | Bodenstein | |
| 4,804,464 A | 2/1989 | Schevey | |
| 4,871,452 A | 10/1989 | Kohler et al. | |
| 5,080,797 A | 1/1992 | Volkner | |
| 5,309,938 A | 5/1994 | Ellgoth et al. | |
| 5,351,337 A | 9/1994 | Deutsch | |
| 5,352,369 A | 10/1994 | Heinig, Jr. | |
| 5,424,032 A | 6/1995 | Christensen et al. | |
| 5,443,733 A | 8/1995 | Mueller et al. | |

(Continued)

FOREIGN PATENT DOCUMENTS

DE 31 17 473 A1 11/1982

(Continued)

OTHER PUBLICATIONS

International Search Report in related Application No. PCT/US2006/002075.

(Continued)

*Primary Examiner*—Walter D Griffin
*Assistant Examiner*—Cameron J Allen
(74) *Attorney, Agent, or Firm*—Dean W. Russell; Kristin M. Crall; Kilpatrick Stockton LLP

(57) ABSTRACT

The invention described herein contains two aspects, usable together or separately, that address the needs in the art described above, namely a first aspect that relates to the provision of a transportable water purification system that can be contained on a passenger transport vehicle, and that can use, but does not require, continuous, real-time monitoring, and a second aspect that relates to the use of UV purification of the water as it is uploaded to the passenger transport vehicle after a single pass through the UV chamber.

7 Claims, 3 Drawing Sheets

U.S. PATENT DOCUMENTS

| | | | |
|---|---|---|---|
| 5,622,207 A | 4/1997 | Frank | |
| 5,772,896 A | 6/1998 | Denkewicz, Jr. et al. | |
| 5,792,369 A | 8/1998 | Johnson | |
| 5,855,777 A | 1/1999 | Bachand et al. | |
| 5,858,246 A | 1/1999 | Rafter et al. | |
| 5,935,609 A | 8/1999 | Denkewicz, Jr. et al. | |
| 5,997,812 A | 12/1999 | Burnham et al. | |
| 6,093,422 A | 7/2000 | Denkewicz, Jr. et al. | |
| 6,106,691 A | 8/2000 | Nakamura et al. | |
| 6,143,185 A * | 11/2000 | Tracy et al. | 210/744 |
| 6,180,016 B1 | 1/2001 | Johnston et al. | |
| 6,217,780 B1 | 4/2001 | Denkewicz, Jr. et al. | |
| 6,254,894 B1 | 7/2001 | Denkewicz, Jr. et al. | |
| 6,315,886 B1 | 11/2001 | Zappi et al. | |
| 6,463,956 B2 | 10/2002 | Walker | |
| 6,548,054 B2 * | 4/2003 | Worley et al. | 424/78.36 |
| 6,585,899 B1 | 7/2003 | Edvardsson et al. | |
| 6,627,053 B2 | 9/2003 | Hirota et al. | |
| 6,743,361 B1 | 6/2004 | Doege et al. | |
| 7,182,854 B1 * | 2/2007 | Kroesser et al. | 210/86 |
| 2002/0046569 A1 | 4/2002 | Faqih | |
| 2002/0100733 A1 * | 8/2002 | King et al. | 210/753 |
| 2002/0125196 A1 * | 9/2002 | Rosenblatt et al. | 210/721 |
| 2004/0067156 A1 * | 4/2004 | Eldred | 422/20 |
| 2004/0086480 A1 * | 5/2004 | Worley et al. | 424/78.22 |
| 2004/0133968 A1 * | 7/2004 | Hoehne et al. | 4/233 |
| 2005/0016906 A1 | 1/2005 | Gettman | |
| 2005/0126927 A1 | 6/2005 | Lindauer et al. | |
| 2005/0155939 A1 * | 7/2005 | Stadelmann | 210/764 |
| 2006/0076506 A1 | 4/2006 | Duthie, Jr. | |

FOREIGN PATENT DOCUMENTS

| | | |
|---|---|---|
| DE | 197 17 579 A1 | 10/1998 |
| EP | 1 046 544 A2 | 10/2000 |
| WO | WO 03089377 A1 * | 10/2003 |

OTHER PUBLICATIONS

"Airline Water Supplies," available at http://www.epa.gov/airlinewater, 9 pages, 2004.

"EPA Reaches Agreement with Major Airlines to Implement New Aircraft Water Protocols," available at http://yosemite/epa.gov.opa, 2 pages, Nov. 9, 2004.

Office Action dated Jun. 27, 2008 in related U.S. Appl. No. 11/048,034.

Office Action dated May 28, 2009 in related U.S. Appl. No. 11/048,034.

Response dated Jul. 10, 2009 in related U.S. Appl. No. 11/048,034.

Office Action dated Nov. 16, 2009 in related U.S. Appl. No. 11/048,034.

* cited by examiner

METHODS AND SYSTEMS FOR DISINFECTING POTABLE WATER SUPPLIES

This application is a continuation-in-part of U.S. Ser. No. 11/048,034, filed Jan. 31, 2005, the entire contents of which are incorporated by reference herein.

BACKGROUND OF THE INVENTION

1. Field of the Invention

This invention relates to apparatus, methods, and systems for purifying, and maintaining the purity of, water supplies, and in particular potable water supplies, on transportation equipment, such as planes, trains, ships, and the like. The invention further relates to two aspects: the first aspect concerns apparatus, methods, and systems for purifying water supplies as they are loaded into the transportation equipment, to ensure that the water is supplied in initially purified, desirably potable, form; the second aspect concerns apparatus, methods, and systems for treating the water while the transportation equipment is in operation, maintaining the purified nature of the water for the duration of a trip.

2. Description of Related Art

The issue of water quality, and in particular, of potable water quality, on transportation equipment, such as aircraft, trains, boats and ships, and the like is becoming more of a concern to regulatory authorities. This is particularly true in the United States for commercial passenger airlines with respect to the potable water supplies contained aboard commercial aircraft.

According to the U.S. Environmental Protection Agency ("EPA" or "Agency"), more than twelve percent of passenger aircraft tested in the United States during Aug. and Sep. 2004 "carried water that did not meet EPA standards." Water on-board these aircraft tested positive for total coliform bacteria, with some water also testing positive for *E. coli* bacteria. As noted by the EPA, "[b]oth total coliform and *E. coli* are indicators that other disease-causing organisms (pathogens) could be in the water and could potentially affect people's health." See "Airline Water Supplies" at http://www.epa.gov/airlinewater.

On Nov. 9, 2004, EPA announced commitments from numerous U.S. passenger airlines "to implement new aircraft water testing and disinfection protocols." Administrative agreements executed with these airlines require increased monitoring of water quality on-board commercial aircraft. They also require airlines to analyze possible sources of contamination existing outside their aircraft and "to provide information related to practices of boarding water from foreign public water supplies not regulated by EPA." See "EPA Reaches Agreement with Major Airlines to Implement New Aircraft Water Protocols" at http://yosemite.epa.gov/opa.

Clear from EPA's recent public announcements is that improving water quality on-board passenger aircraft is an important objective of the Agency. Systems and techniques effecting such improvement thus may provide valuable tools to U.S. airlines as they seek to comply with the administrative agreements. They may also be useful to the EPA as it works to enhance the quality of drinking and other water made available to the public.

U.S. Pat. No. 4,871,452 to Kohler, et al., entitled "On-Board Water Supply," discloses equipment for purifying waste water from galleys, sinks, and toilets of aircraft. Waste water from these areas discharges to a tank, after which it passes through a mechanical filter, a bed of active carbon, ozone and osmotic stages, and a disinfection stage involving addition of chlorine and irradiation with ultraviolet ("UV") light. Thereafter, the water is made available to aircraft passengers for certain uses.

Discussed in U.S. Pat. No. 6,143,185 to Tracy, et al. are alternate systems for decontaminating waste water from aircraft toilets, sinks, and galleys. They too include a mechanical particulate filter, activated carbon, and a source of UV light. Alternatively, according to the Tracy patent, the waste water may be exposed to microwaves or treated with chlorine or iodine. A sensor may be used to measure "the level of clarity of the treated water as an indication of its purity" and restrict opening of a control valve until acceptable clarity levels are obtained. The entire contents of both the Kohler and Tracy patents are incorporated herein by this reference.

However, these systems and methods are directed at purifying wastewater removed from the aircraft. Currently, airlines typically attempt to ensure that the potable water aboard the airplanes is fit for human consumption by employing a quarterly disinfection protocol and monthly water sampling. In addition to being time consuming and labor intensive, these techniques may not be sufficient to satisfy the EPA under the agreements described above.

Moreover, quarterly disinfection does not adequately address the issue of contamination introduced in uploaded water, which is of particular concern for aircraft flying to and from, and being serviced in, non-industrialized areas. In addition, air must be introduced into the water storage and dispensing system on the aircraft in order to maintain pressurization, as well as to drain the system during routine servicing. This air can introduce pathogens that can multiply, and cause unsanitary conditions and unacceptable water quality in the intervals between samplings or disinfection procedures. In effect, because the water storage and dispensing system is routinely exposed to the outside environment, potable water quality cannot be ensured without some form of continuous treatment.

Continuous treatment of potable water supplies presents another set of potential problems to be solved, however. Continuous treatment requires continuous or semi-continuous dosing of the water, with the requisite dosing equipment (metering and monitoring equipment, dosing agent storage equipment, and/or equipment for in-situ generation of the dosing agent). Conventional dosing of sanitizing chemicals often requires continuous, real-time monitoring is also necessary to ensure adequate performance.

As a result, there remains a need in the art for an apparatus, method, and system for continuous treatment of portable water supplies to purify, or maintain the purity of the water supplies, that does not require continuous real-time monitoring, that is essentially self-regulating, and that is easily transportable (e.g., on aircraft), without the need for large or heavy dosing or monitoring equipment.

In addition, in order to reduce the load on such a purification system, and to provide purified water for transportation equipment without such a purification system, there remains a need in the art for apparatus, methods, and systems capable of purifying water before it is uploaded to the transportation equipment.

SUMMARY OF THE INVENTION

The invention described herein contains two aspects, usable together or separately, that address the needs in the art described above, namely a first aspect that relates to the provision of a transportable water purification system that can be contained on a passenger transport vehicle, and a second aspect that relates to the purification of water as it is uploaded to the passenger transport vehicle.

More particularly, the first aspect of the invention relates to a passenger transport vehicle containing a reservoir with a supply of fresh water for use and recirculation on board the transportation equipment, and a water purification device in fluid communication with the supply of fresh water. The water purification device contains one or more disinfection chemicals that supply one or more disinfecting species to the water by controlled release. This controlled release may take the form of chemical, reduction/oxidation, or electrochemical equilibrium between solid disinfection chemical and disinfecting species, or may occur over time as a soluble substrate or matrix, in which the disinfection chemical is embedded, dissolves in the water, or is eroded by the re-circulating water. By controlling the release of the disinfecting species, the requirement for constant, real-time monitoring of the water chemistry and dosing system is eliminated, although such a system may be included if desired.

The second aspect of the invention relates to apparatus, methods and systems for treating water to be uploaded to sanitize it before it becomes part of the water supply on board the passenger transport vehicle. The apparatus contains a chamber that is in fluid communication with a reservoir on the passenger transport vehicle during upload, and having an ultraviolet (UV) lamp assembly. The UV lamp assembly is desirably adapted to emit a dosage of UV radiation above the minimum value needed to kill pathogens in the water. By using a UV radiation treatment system on uploaded water, fast disinfection rates, inactivation of protozoa, disinfection of hard water, and high kill rates can be achieved without the generation of disinfection residuals in water. Moreover, this can be achieved by a single pass through the purification apparatus.

DETAILED DESCRIPTION OF SPECIFIC EMBODIMENTS

Specific embodiments of the first aspect of the invention will be described with respect to FIG. 1. It is to be understood that this description is exemplary and not limitative of this aspect of the invention, however.

Figure 1:
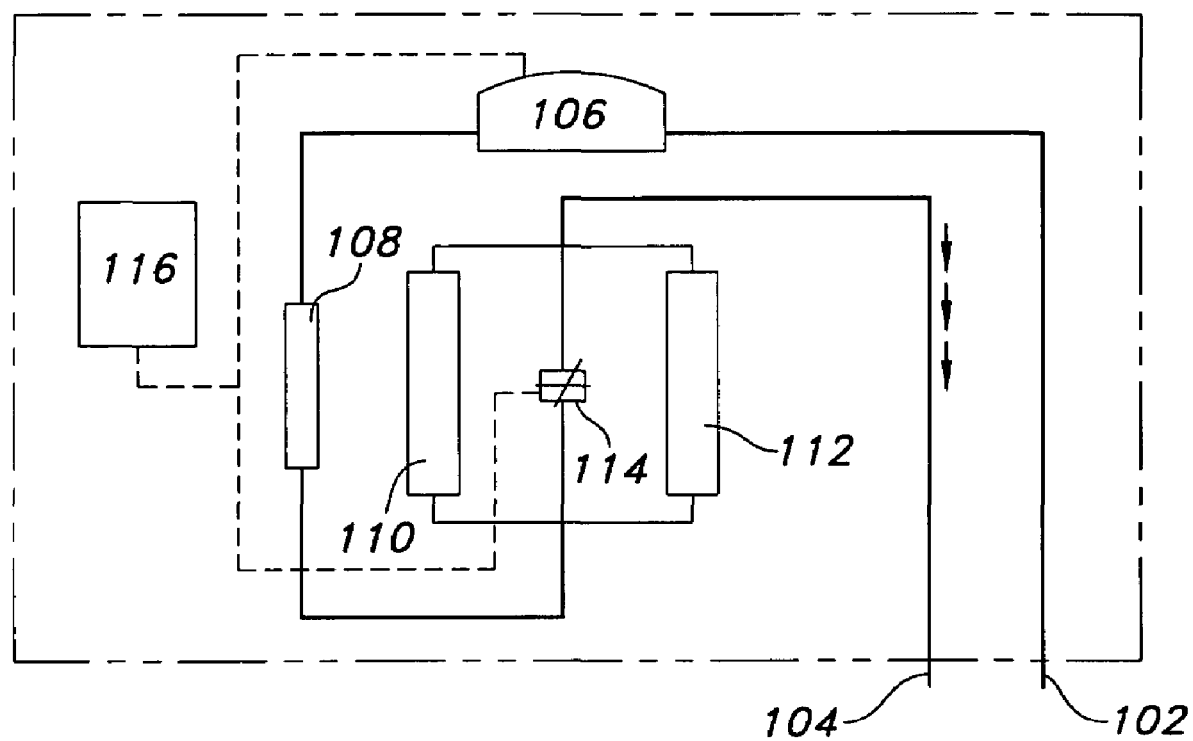
FIG. 1 is a schematic view of a water purification apparatus according to the first aspect of the invention.

Water purification apparatus 100, shown in FIG. 1, is designed to be incorporated into a passenger transport vehicle, which could be any known or future means of transport. These include, without limitation, aircraft, trains, watercraft, automobiles, spacecraft, and the like. Desirably, the passenger transport vehicle is an aircraft. The passenger transport vehicle will contain a water reservoir or storage tank, not shown in FIG. 1, that is in fluid communication with water purification apparatus 100 through supply line 102 and return line 104. As shown in FIG. 1, water flowing into the apparatus through supply line 102 passes through water heater 106. The presence and/or operation of such a heater is optional, but would be desirable in the event that the apparatus is exposed to low temperatures, particularly those at or below the freezing point of water. The water heater may be of any suitable type, including a heat exchanger, an electric heater, a fossil-fuel fired heater, and the like.

The water then passes through water softening cartridge 108, which can contain any media suitable for removing at least one type of ion, and in particular, divalent metal cations, from the water. Suitable media include ion exchange resins, zeolites, and the like. It will be understood that the presence and operation of the water softening cartridge is optional, but would be desirable where the water in the reservoir or storage tank is sufficiently hard that softening is deemed necessary to prevent calcification of water handling equipment.

Water leaving the water-softening cartridge then passes through one or more disinfection cartridges 110 and/or 112, and returns to the water reservoir or tank through return line 104. The disinfection cartridges contain a disinfection chemical that releases disinfecting species into the water in sufficient concentration to reduce or substantially eliminate the presence or growth of undesirable microorganism, including pathogens such as bacteria and viruses. Moreover, this release occurs in a controlled manner over a period of time, disinfecting the water over this time period, without the need for continuous dosing or continuous monitoring, or the requisite equipment. The disinfection cartridges contain a water inlet, a chamber in fluid communication with the water inlet, and a water outlet, also in fluid communication with the chamber. Inside the chamber, the water contacts the disinfection chemical contained therein, which releases a disinfecting species into the water. The disinfecting species attacks biological contaminants within the water as it flows out of the outlet of the disinfection cartridge. The disinfecting species also react with water to provide extended residual protection as the water is re-circulated between the water reservoir or tank and the water purification apparatus, and is distributed to its various uses on the passenger transport vehicle.

Suitable disinfection chemicals include, but are not limited to, those that are suitable for disinfecting potable water. These can be materials that release metal ions into the water, such as Ag(I) ions, Cu(II) ions, and/or Zn(II) ions, including those described in U.S. Pat. Nos. 4,608,247; 5,352,369; 5,772,896; 5,855,777; 5,935,609; 6,093,422; 6,217,780; and 6,254,894 (the entire contents of each of which are incorporated by reference); and/or available as NATURE2® (Zodiac Pool Care, Inc.). The disinfection chemicals can also be materials that supply halogen to the water, such as those described in U.S. Pat. No. 5,858,246, or a halogenated polystyrene hydantoin, such as a chlorine polystyrene hydantoin, commercially available from Vanson Halosource. Yet another alternative is the use of an electrochemical cell to generate mixed oxidants, including but not limited to hypochlorous acid, from salts dissolved in the water. In this case, the disinfection chemical is the dissolved salt in the chamber, and the disinfecting species is the mixed oxidants produced therefrom.

Each of these systems releases disinfecting species in a controlled or self-regulating manner, wherein the self-regulation mechanism results from chemical, electrochemical, oxidation/reduction, or other equilibrium between disinfection chemicals in the chamber and the disinfecting species in the water.

Returning to FIG. 1, two cartridges containing the disinfection chemical(s) are shown connected in parallel. When the system contains two or more cartridges and is operated in a parallel configuration, as shown in FIG. 1, the flow through them can be controlled by a flow control mechanism, such as a flow control mechanism 114, which is operatively connected to controller 116. As shown in FIG. 1, this optional flow controller can also be operatively connected to heater 106. It will be appreciated that other control schemes are also possible, and fall within the scope of the invention. For example, if the system is operated to pass the water through only one of the cartridges at a time, switching to the second cartridge if additional sanitizing capacity is needed, or if the first cartridge becomes clogged or the amount of disinfection chemicals therein becomes insufficient, a somewhat different flow control scheme would be used.

In addition to the equipment described above, the water purification apparatus of the invention can contain other elements, including but not limited to manifolds, scale inhibition modules, brine cartridges and pumps (for use with electrolytic purification), drain valves, pressurization pumps, water level sensors, and the like, as described in U.S. Ser. No. 11/048,034, incorporated herein by reference.

Figure 2:
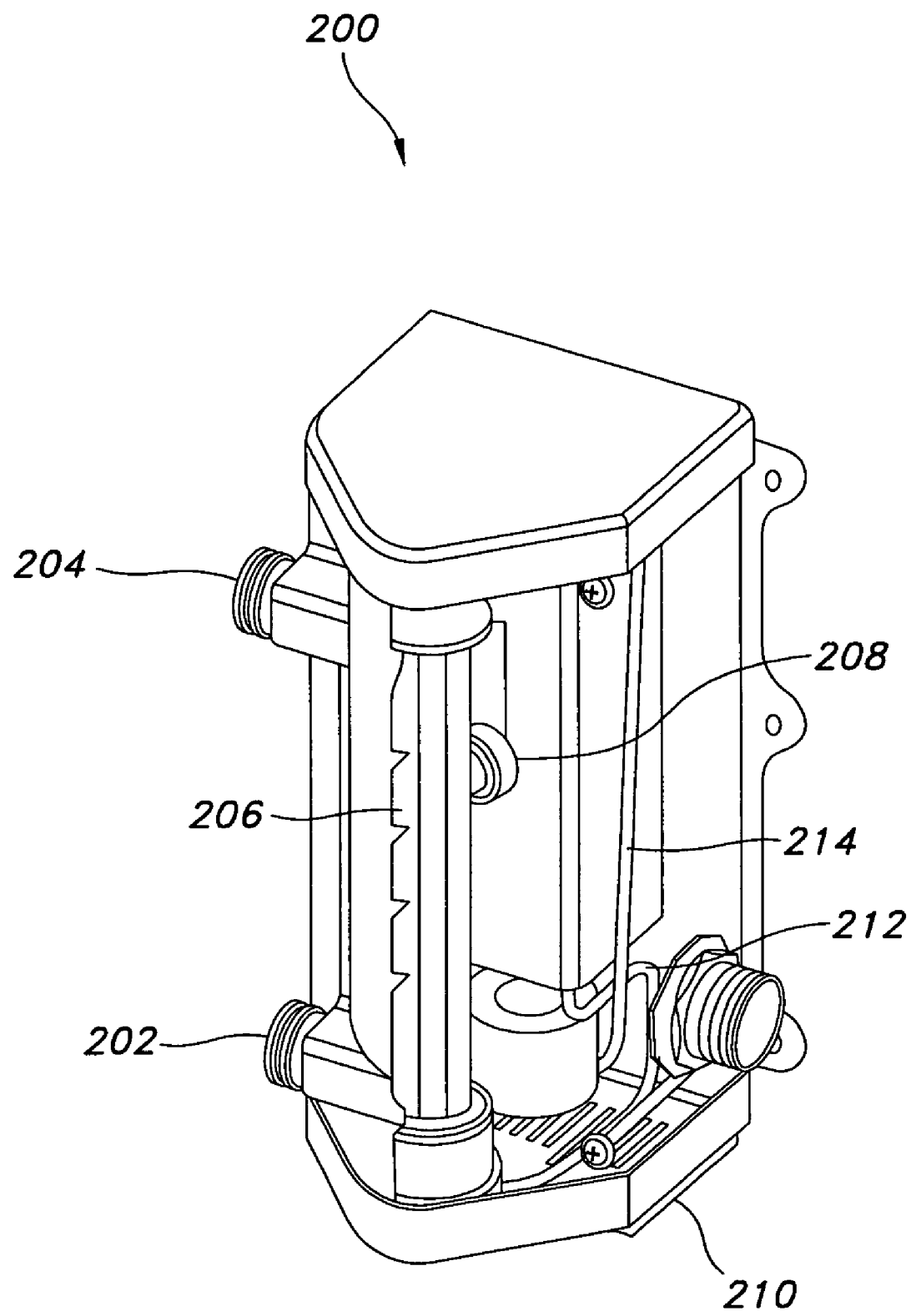
FIG. 2 is a perspective view of one embodiment of a water purification apparatus according to the second aspect of the invention.
Figure 3:
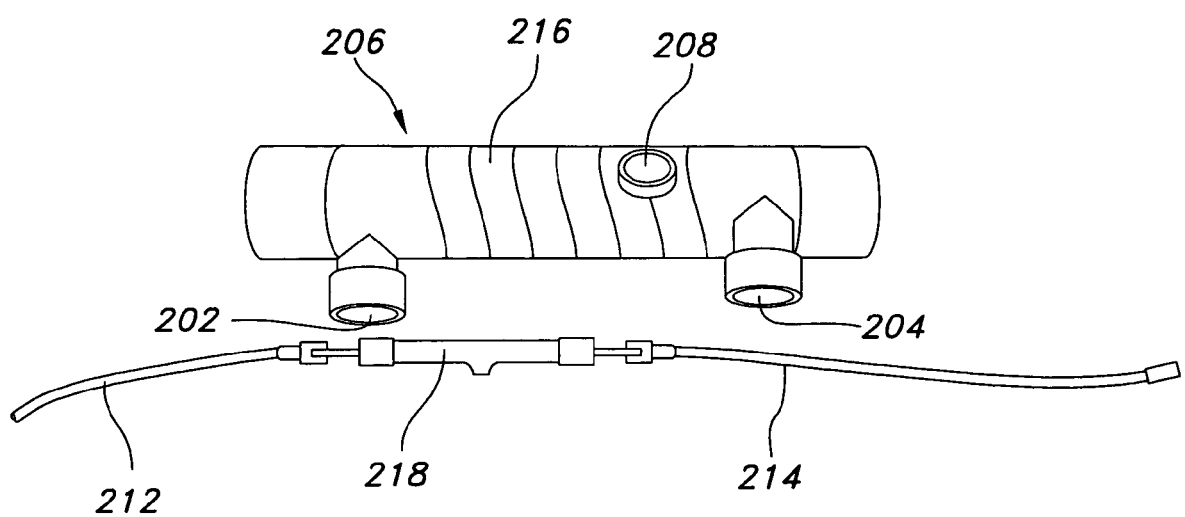
FIG. 3 is a side plan view of elements of one embodiment of a purification chamber and UV lamp according to the second aspect of the invention.

Specific embodiments of the second aspect of the invention are described herein by reference to FIG. 2 and FIG. 3, which are exemplary illustrations and not intended to limit the scope of the claims.

FIG. 2 shows a perspective cutaway view of one embodiment of an apparatus for uploading water to a passenger transport vehicle 200. Water from a nearby source (not shown) enters the apparatus through inlet 202 and leaves the apparatus through outlet 204 after passing through purification chamber 206. While in purification chamber 206, the water is exposed to UV radiation, which can be monitored by a UV sensor (not shown) disposed adjacent to UV transparent chamber window 208. Power leads 210 and 212 supply electrical current to a UV lamp (not shown) disposed with in the purification chamber 206. Electrical current is supplied to the leads through electrical connector 214.

FIG. 3 shows a plan view of one embodiment of purification chamber 206. In this embodiment, unpurified water entering the chamber through inlet 202 passes through a helical tube 216 and out of the chamber through outlet 204. The helical tube 216 coils around a longitudinal core or central opening along the length of the chamber, and within which is disposed UV source 218, shown outside the longitudinal core for clarity, and which is supplied electrical current through leads 212 and 214. The helical tube functions to keep the water separate from the UV source, while providing sufficient residence time in the chamber that the desired dosage of UV radiation is obtained. The tube is relatively transparent to UV radiation, and is desirably made of quartz or other UV transparent material. It also optimizes the flow profile of water through the unit, maintaining the intensity of exposure to the UV radiation source The UV source can be any conventional UV source, but is desirably is a quartz metal halide lamp, such as a quartz medium pressure metal halide lamp. Desirably, the dosage of UV radiation emitted by the UV lamp and transferred to the water to be treated will be sufficient to substantially reduce levels of pathogens such as bacteria, viruses, and protozoa. It is to be expected that the amount of reduction obtained for bacteria would be larger than that obtained for viruses, which in turn would be larger than that obtained for protozoa. The dosage of radiation supplied to the water can be monitored through transparent window 208 by disposing a suitable UV detector adjacent to the window.

The UV radiation source can be subjected to electrical or electronic control disposed between it and its electrical supply, allowing it to operate in a periodic or continuous fashion.

The apparatus of this aspect of the invention provides non-chemical disinfection without generating a chemical disinfecting residual species or disinfecting species by-products, and can disinfect the water passing through it in seconds. It can accommodate a wide variety of flow rates. Typical flow rates will generally be above 5 gpm, and will generally range from about 5 to 15 gpm, more particularly from about 10-15 gpm. This ability to purify water using flow rates in this range makes the invention suitable for the uploading of water during the servicing of passenger transport vehicles, such as aircraft; However, flow rates below and above this range can also be easily used. The use of the apparatus of the invention results in reduction of pathogens including bacteria, viruses, and protozoa, with high kill rates, making it particularly suitable for use in non-industrialized countries, where the quality of available water sources may be less likely to meet U.S. EPA and/or WHO standards for microbiological purity in drinking water, and may be more likely to be contaminated with such organisms.

It will be apparent that either aspect of the invention can be used separately. For example, if it is necessary to upload water from suspect water sources to transportation equipment without the purification system of the first aspect of the invention, then the second aspect of the invention can be used alone. If relatively pure water is available for upload, or has been uploaded, then the first aspect of the invention can be used to maintain its purity while it is aboard the passenger transport vehicle. Moreover, the aspects can be used together to provide initially purified water for upload (using the second aspect of the invention) and maintaining the purity of the water during transport (using the first aspect of the invention).

What is claimed is:

1. A system for purifying potable water for use on a passenger transport vehicle, comprising:
    a. reservoir containing a supply of potable water for use and recirculation on-board the passenger transport vehicle;
    b. a water purification device in fluid communication with the supply of potable water, comprising one or more disinfection chemicals, wherein the water purification device is adapted to release at least one disinfection chemical to the water in a self-regulating manner controlled through chemical equilibrium, so as to eliminate the need for constant, real-time monitoring of water chemistry, wherein at least one of the one or more disinfection chemicals comprises halogen.

2. The system of claim 1, wherein the passenger transport vehicle is an aircraft, train, or watercraft.

3. The system of claim 2, wherein the passenger transport vehicle is an aircraft.

4. The system of claim 1, wherein the water purification device comprises:
    a. a chamber;
    b. an inlet and outlet in fluid communication with the chamber and the supply of potable water; and in which the one or more disinfection chemicals is disposed within the chamber, the device being capable of releasing at least one disinfection chemical to the water at a controlled rate over a period of time.

5. The system of claim 1, wherein the halogen species comprises hypochlorous acid and hypochlorite ions.

6. The system of claim 1, wherein the disinfection chemical comprises halogenated polystyrene hydantoin.

7. The system of claim 1, further comprising one or more of a water-softening device, a water heater, or a flow control device, each in fluid communication with the supply of water.

* * * * *

UNITED STATES PATENT AND TRADEMARK OFFICE
CERTIFICATE OF CORRECTION

| | |
|---|---|
| PATENT NO. | : 7,666,317 B2 |
| APPLICATION NO. | : 11/274680 |
| DATED | : February 23, 2010 |
| INVENTOR(S) | : Angela M. Hsueh and Razmik Baghdassarzadeh Boodaghians |

It is certified that error appears in the above-identified patent and that said Letters Patent is hereby corrected as shown below:

Title Page item 73, Assignee, delete "MAC" and insert -- MAG --.

Signed and Sealed this
Twenty-ninth Day of March, 2016

Michelle K. Lee
*Director of the United States Patent and Trademark Office*